US012771117B2

(12) United States Patent
Fang et al.

(10) Patent No.: US 12,771,117 B2
(45) Date of Patent: Oct. 20, 2026

(54) TERMINAL DESIGNS FOR ADJUSTING HARNESS PROTECTION TIME

(71) Applicant: Littelfuse, Inc., Chicago, IL (US)

(72) Inventors: Yan Fang, Chicago, IL (US); Jianhua Chen, Chicago, IL (US); Jun Gang Wang, Chicago, IL (US)

(73) Assignee: Littelfuse, Inc., Rosemont, IL (US)

( * ) Notice: Subject to any disclaimer, the term of this patent is extended or adjusted under 35 U.S.C. 154(b) by 176 days.

(21) Appl. No.: 18/812,043

(22) Filed: Aug. 22, 2024

(65) Prior Publication Data

US 2025/0070546 A1 Feb. 27, 2025

(30) Foreign Application Priority Data

Aug. 25, 2023 (CN) ........................ 202311085430.3

(51) Int. Cl.
*H02H 5/04* (2006.01)
*B60R 16/02* (2006.01)

(52) U.S. Cl.
CPC ......... *H02H 5/047* (2013.01); *B60R 16/0207* (2013.01)

(58) Field of Classification Search
CPC .... H02H 5/047; H02H 5/042; B60R 16/0207; B60R 16/0215; B60L 3/00; H01R 13/02; H01R 13/68
See application file for complete search history.

(56) References Cited

U.S. PATENT DOCUMENTS 8,570,708 B2 * 10/2013 Itagaki .................. H01G 4/232 361/321.1
2010/0123995 A1 * 5/2010 Otsuka .................. H01G 4/228 361/308.1
2015/0187495 A1 * 7/2015 Maeda .................... H01G 4/30 361/303
2016/0006155 A1 * 1/2016 Trujillo ................. H01R 43/16 29/874
2021/0043408 A1 * 2/2021 Urrea .................... H01R 12/57
2021/0313097 A1 * 10/2021 Tsang .................... H02H 9/026

* cited by examiner

*Primary Examiner* — Crystal L Hammond
*Assistant Examiner* — Samantha L Faubert
(74) *Attorney, Agent, or Firm* — KDW Firm, PLLC

(57) ABSTRACT

A terminal assembly, arranged for an automobile harness, comprising: a substrate; a modified terminal, arranged as a plate structure that is arranged on the substrate and extends perpendicularly with respect to a plane of the substrate; and a resettable fuse component, the resettable fuse component comprising a polymer positive temperature coefficient (PPTC) material, and coupled in series with the modified terminal.

20 Claims, 2 Drawing Sheets

TERMINAL DESIGNS FOR ADJUSTING HARNESS PROTECTION TIME

BACKGROUND

Field

Embodiments relate to the field of circuit protection devices, and in particular to circuit protection devices in automotive harnesses.

Discussion of Related Art

In the present day, automobiles including electric vehicles (EV) use complex wiring harnesses that must be protected from damage caused by different faults, such as when a short circuit occurs in the vehicle wiring. Some type of harnesses use polymer positive temperature coefficient (PPTC) devices as protection, that may act as resettable fuses. When a fault occurs that drives the temperature beyond a certain trip temperature of the PPTC device, the PPTC device will devices latch into a high resistance state. Once the fault is removed and the power is cycled, the PPTC device automatically resets and the protected system is restored to normal operation. However, for different applications, it may be desirable to control the time that is required for a protection device to trip (trip time). Control of the trip time may be important so that a protection device does not trip too rapidly on the one hand, or too sluggishly, on the other hand.

With respect to this and other considerations the present disclosure is provided.

BRIEF SUMMARY

In one embodiment, a terminal assembly that is arranged for an automobile harness is provided. The terminal assembly may include a substrate; a modified terminal, comprising a plate structure that is arranged on the substrate and extends perpendicularly with respect to a plane of the substrate; and a resettable fuse component, the resettable fuse component comprising a polymer positive temperature coefficient (PPTC) material, and coupled in series with the modified terminal.

In another embodiment, a terminal assembly of an automobile harness is provided, including a substrate and a modified terminal, comprising a plate structure that is arranged on the substrate and extends perpendicularly with respect to a plane of the substrate. The terminal assembly may include a wiring assembly, coupled to the substrate; and a resettable fuse component, the resettable fuse component comprising a polymer positive temperature coefficient (PPTC) material, and coupled in series with the wiring assembly and the modified terminal.

In another embodiment, a terminal assembly of an automobile harness may include a substrate, arranged as a printed circuit board, and a wiring assembly, comprising a pair of wires, coupled to the substrate. The terminal assembly may also include a modified terminal, comprising a plate structure that is arranged as a pair of plates on the substrate and extends perpendicularly with respect to a plane of the substrate. The terminal assembly may further include a polymer positive temperature coefficient (PPTC) structure, arranged between the pair of plates, wherein the PPTC structure is coupled in series with the modified terminal, and wherein the PPTC structure extends outside of the pair of plates.

DESCRIPTION OF EMBODIMENTS

Figure 1A:
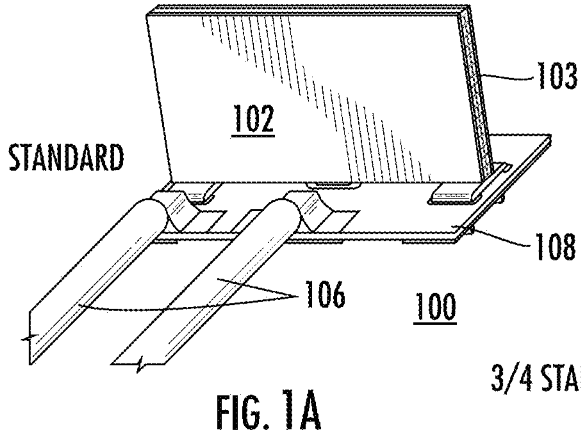
FIG. 1A shows a known terminal design.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms “on,” “overlying,” “disposed on” and “over” may be used in the following description and claims. “On,” “overlying,” “disposed on” and “over” may be used to indicate that two or more elements are in direct physical contact with one another. Also, the term “on,”, “overlying,” “disposed on,” and “over”, may mean that two or more elements are not in direct contact with one another. For example, “over” may mean that one element is above another element while not contacting one another and may have another element or elements in between the two elements. Furthermore, the term “and/or” may mean “and”, it may mean “or”, it may mean “exclusive-or”, it may mean “one”, it may mean “some, but not all”, it may mean “neither”, and/or it may mean “both”, although the scope of claimed subject matter is not limited in this respect.

In various embodiments, a novel harness protection arrangement is shown for automobile wiring harnesses. The harness protection arrangement is based upon a terminal assembly that may be employ a resettable fuse component. According to embodiments of the disclosure, the resettable fuse component is based upon a PPTC device, which device may be electrically coupled in series with a wiring assembly of a wiring harness and a given terminal. Some terminal designs may be based upon copper plated steel.

The present inventors have discovered that certain components of terminal assemblies for automobile harnesses may be modified in a manner to tailor the protection properties of the terminal assembly. As used herein, a ‘terminal assembly’ may refer to circuitry that includes a terminal, a resettable fuse, in particular, a PPTC device, as well as wiring that connects to the terminal. In particular, by modifying the design of the terminal, the type of wiring, and/or the use of a cap in the resettable fuse, the trip time of the resettable fuse may be substantially or precisely tailored according to a desired application.

By way of background, known PPTC devices are characterized by a transition between a relatively lower electrical resistance state (the term ‘resistance’ may be used herein to refer to electrical resistance) to a relatively higher resistance state, where the transition takes place at a given temperature, often referred to as the trip temperature. As known in the art, the absolute resistance of the PPTC device and the relative change in resistance and the trip temperature may be tailored by selection of a suitable polymer matrix for the PPTC device, a suitable conductive filler, as well as a suitable composition. At the temperature range below the trip temperature, the PPTC device will retain a relatively lower resistance, while at the temperature range above the trip temperature, the PPTC device will have a relatively higher resistance. In some examples, the resistance above the trip temperature may be 10 times, 100 times, 1000 times, or 10000 times the resistance of the PPTC device below the trip temperature. In various non-limiting embodiments a PPTC device may be formed from a polyvinylidene fluoride (PVDF) matrix and a carbon filler.

Figure 1B:
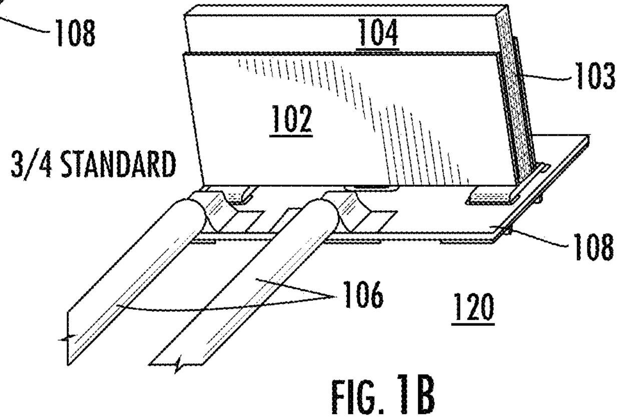
FIG. 1B shows a terminal design for use with embodiments of the disclosure.
Figure 1C:
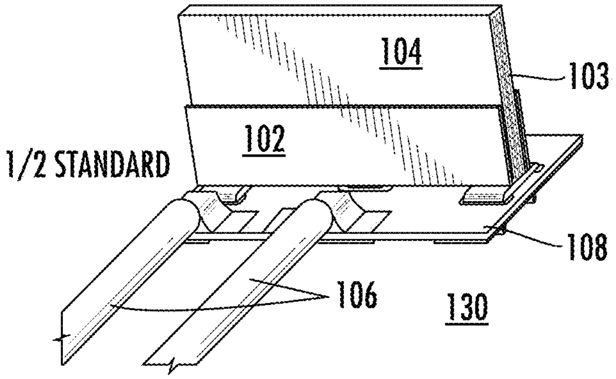
FIG. 1C shows another terminal design for use with other embodiments of the disclosure.
Figure 1D:
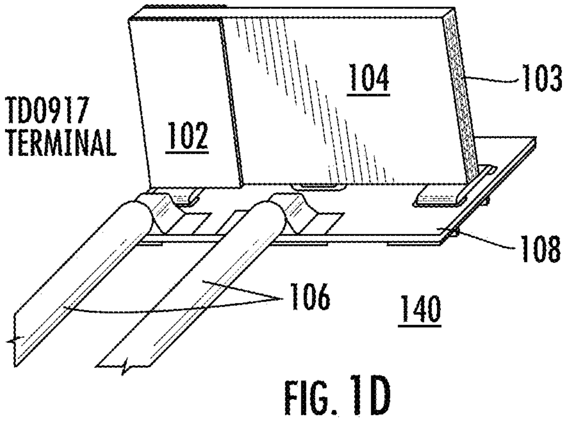
FIG. 1D shows a further terminal design for use with additional embodiments of the disclosure.

Turing to the figures, FIG. 1A shows a known terminal design, while FIG. 1B shows a terminal design for use with embodiments of the disclosure, FIG. 1C shows another terminal design for use with other embodiments of the disclosure, and FIG. 1D shows a further terminal design for use with additional embodiments of the disclosure. The terminal arrangement 100 includes a terminal 102, which may be formed of a copper plate as shown, and is designated as a standard terminal design. In this example, a PPTC structure 103, which structure may be a plate-like layer, is disposed between copper plates that form the terminal 102.

In FIG. 1B, the modified terminal design is shown as terminal arrangement 120, and is designated as ¾ standard design. The terminal 102 in this configuration extends just over approximately ¾ of the body of the PPTC structure 103, leaving an exposed portion 104. In this example, the exposed portion 104 extends horizontally above the terminal 102. In other words, approximately ¼ of the PPTC structure extends outside of the pair of plates that form the terminal 102.

In FIG. 1C, the modified terminal design is shown as terminal arrangement 130, and is designated as ½ standard design. The terminal 102 in this configuration extends just over approximately ½ of the body of the PPTC structure 103, leaving an exposed portion 104. In this example, the exposed portion 104 also extends horizontally above the terminal 102.

Finally, in FIG. 1D, the modified terminal design is shown as terminal arrangement 140, and is based upon a TD0917 terminal. The terminal 102 in this configuration extends just less than ½ of the body of the PPTC structure 103, leaving an exposed portion 104. In this example, the exposed portion 104 extends vertically next to the terminal 102.

In each of the designs of FIG. 1A-1D, the terminal 102 may be coupled to external leads 106 using a substrate 108, such as a printed circuit board as shown. The external leads 106 may form part of a wiring assembly for an automotive harness, for example. In all the designs of FIG. 1A-1D the terminal 102 is disposed as a plate on the substrate 108 and extends perpendicularly with respect to the substrate 108.

Note that in each of the designs of FIG. 1B-1D the exposed portion 104 may include a thin metal foil that is disposed over the PPTC body (not visible) to act as an inner electrode in contact with the terminal 102. In the designs of FIGS. 1A-1D the different size and configuration of the terminal 102 may lead to different trip times at the same fault current. These results are discussed below.

Figure 1E:
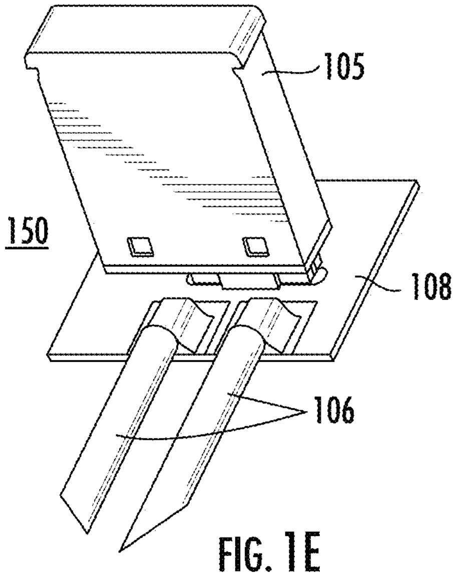
FIG. 1E shows an additional terminal design according to further embodiments of the disclosure.

FIG. 1E shows an additional terminal design according to further embodiments of the disclosure. The terminal design 150 may be similar to the aforementioned designs of FIGS. 1A-1D, where like components are labeled the same. In this case, a PPTC component (not visible) may be arranged as a blade fuse device that is enclosed in a cap 105, where the effect of a cap is discussed further below.

Table I presents a summary of measurements of trip time for different terminal assemblies, according to various embodiments of the disclosure. The different columns of Table I. are organized to illustrate trip time as a function of different current levels, from 25 Amperes (A) to 150 A. The different rows of Table I are organized according to different terminal design, as well as for two different wire different wire cross-sectional areas. Also shown in Table I are the minimum and maximum trip times specified for different current levels. As shown in Table I, using a AWG9 wire, the standard terminal design generates trip time that is out-of specification for all current levels, meaning the trip time in this case is always greater than the Spec Max values at any given current. Notably, the use of a ¾ standard terminal, a ½ standard terminal, or a TD0917 terminal reduces the trip time with respect to the use of the standard terminal at all current levels. Moreover, the changing from a AWG9 wire to an AWG13 wire, with a smaller cross-section, reduces the trip time in all cases, with a more pronounced effect at currents of 50 A or less. In the examples shown, for current values in the range of 34 A to 50 A, the use of ½ standard terminal or TD0917 brings the trip time to within specification in all cases, while the use of ¾ standard terminal brings the trip time to within specification at 34 A and 40 A.

Turning to table II there is shown trip time for a terminal assembly arrangement for different PPTC devices, based upon a bladed fuse BD280-25 structure, BD1, BD2, and BD3, with and without a cap, again shown for several different current levels. In various embodiments, the cap material may be PBT or Nylon, for example.

In all of the samples shown an AWG9 wire is used. In this set of examples, all the devices are configured to provide trip times within the specification limits for currents up to 50 A. The use of a cap is seen to increase the trip time somewhat compared to samples without caps, which difference may be attributed to the better heat conduction provided by the caps, thus requiring longer times for the PPTC devices to exceed the trip temperature.

TABLE I

| Device | TtT @ 25 A (sec) | TtT@34 A (sec) | TtT@40 A (sec) | TtT@50 A (sec) | TtT@87.5 A (sec) | TtT@150 A (sec) | |
|---|---|---|---|---|---|---|---|
| Spec Min | 3600 | 45 | 20 | 5.0 | 0.0 | 0.0 | AWG9 wire |
| Spec Max | NA | 1800 | 200 | 60.0 | 5.0 | 2.0 | S = 6.6 $mm^2$ |
| Standard Terminal | 3600 | 2000 | 522 | 128.0 | 25.6 | 7.5 | AWG13 wire |
| ¾ standard Terminal | 3600 | 644 | 146 | 66.6 | 14.4 | 4.0 | S = 2.6 $mm^2$ |
| ½ standard Terminal | 3600 | 436 | 114 | 55.8 | 11.7 | 3.2 | |
| TD0917 Terminal | 3600 | 376 | 94 | 44.0 | 9.8 | 2.5 | |

TABLE I-continued

| Device | TtT @ 25 A (sec) | TtT@34 A (sec) | TtT@40 A (sec) | TtT@50 A (sec) | TtT@87.5 A (sec) | TtT@150 A (sec) |
|---|---|---|---|---|---|---|
| ¾ standard Terminal | 3600 | 249 | 128 | 61.2 | 13.8 | 4.0 |
| ½ standard Terminal | 3600 | 218 | 101 | 50.4 | 11.1 | 3.1 |
| TD0917 Terminal | 3600 | 152 | 70 | 39.2 | 9.0 | 2.3 |

note:
25 A 3600 sec, means all devices passed 3600 sec no-trip

TABLE II

| Device | TtT @ 25 A (sec) | TtT@34 A (sec) | TtT@40 A (sec) | TtT@50 A (sec) | TtT@87.5 A (sec) | TtT@150 A (sec) | |
|---|---|---|---|---|---|---|---|
| Spec Min | 3600 | 45 | 20 | 5.0 | 0.0 | 0.0 | AWG9 wire |
| Spec Max | NA | 1800 | 200 | 60.0 | 5.0 | 2.0 | S = 6.6 mm2 |
| BD1 w/cap | 3600 | 124 | 64 | 33.4 | 7.2 | 2.10 | |
| BD2 w/cap | 3600 | 119.2 | 60 | 31.2 | 6.9 | 2.04 | |
| BD3 w/cap | 3600 | 116 | 61 | 32.4 | 7.0 | 2.06 | |
| BD1 wo cap | 3600 | 78 | 46 | 25.2 | 7.0 | 2.02 | |
| BD2 wo cap | 3600 | 69.2 | 45 | 25.4 | 6.7 | 1.96 | |
| BD3 wo cap | 3600 | 76.8 | 46 | 25.8 | 6.9 | 2.02 | |

Turning to table III there is shown a comparison of trip times for the same set of PPTC devices without cap, as in table II, this time comparing the effect of changing wire size from AWG9 to AWG13. These results demonstrate that the smaller area wires (AWG13) generate shorter trip times as compared to the larger area wires (AWG9).

TABLE III

| Device | TtT @ 25 A (sec) | TtT@34 A (sec) | TtT@40 A (sec) | TtT@50 A (sec) | TtT@87.5 A (sec) | TtT@150 A (sec) | |
|---|---|---|---|---|---|---|---|
| Spec Min | 3600 | 45 | 20 | 5.0 | 0.0 | 0.0 | AWG9 wire |
| Spec Max | NA | 1800 | 200 | 60.0 | 5.0 | 2.0 | S = 6.6 mm2 |
| BD1 wo cap | 3600 | 78 | 46 | 25.2 | 7.0 | 2.02 | AWG13 wire |
| BD2 wo cap | 3600 | 69.2 | 45 | 25.4 | 6.7 | 1.96 | S = 2.6 mm$^2$ |
| BD3 wo cap | 3600 | 76.8 | 46 | 25.8 | 6.9 | 2.02 | |
| BD1 wo cap | 235 | 55 | 37 | 21.0 | 5.9 | 1.84 | |
| BD2 wo cap | 256 | 57.2 | 37 | 21.8 | 6.0 | 1.84 | |
| BD3 wo cap | 328 | 66.4 | 42 | 24.0 | 6.6 | 2.00 | |

Turning to table IV there is shown a comparison of trip times for PPTC devices with cap, this time comparing the effect of changing wire size from AWG9 to AWG13. These results demonstrate that the smaller area wires (AWG13) also generate shorter trip times as compared to the larger area wires (AWG9).

TABLE IV

| Device | TtT @ 25 A (sec) | TtT@34 A (sec) | TtT@40 A (sec) | TtT@50 A (sec) | TtT@87.5 A (sec) | TtT@150 A (sec) | |
|---|---|---|---|---|---|---|---|
| Spec Min | 3600 | 45 | 20 | 5.0 | 0.0 | 0.0 | AWG9 wire |
| Spec Max | NA | 1800 | 200 | 60.0 | 5.0 | 2.0 | S = 6.6 mm2 |
| BD1 w/cap | 3600 | 124 | 64 | 33.4 | 7.2 | 2.10 | AWG13 wire |
| BD2 w/cap | 3600 | 119.2 | 60 | 31.2 | 6.9 | 2.04 | S = 2.6 mm$^2$ |
| BD3 w/cap | 3600 | 116 | 61 | 32.4 | 7.0 | 2.06 | |
| BD4 w/cap | 724 | 82 | 52 | 27.4 | 6.6 | 1.96 | |
| BD5 w/cap | 888 | 84.4 | 53 | 28.8 | 7.0 | 2.08 | |

Figure 2:
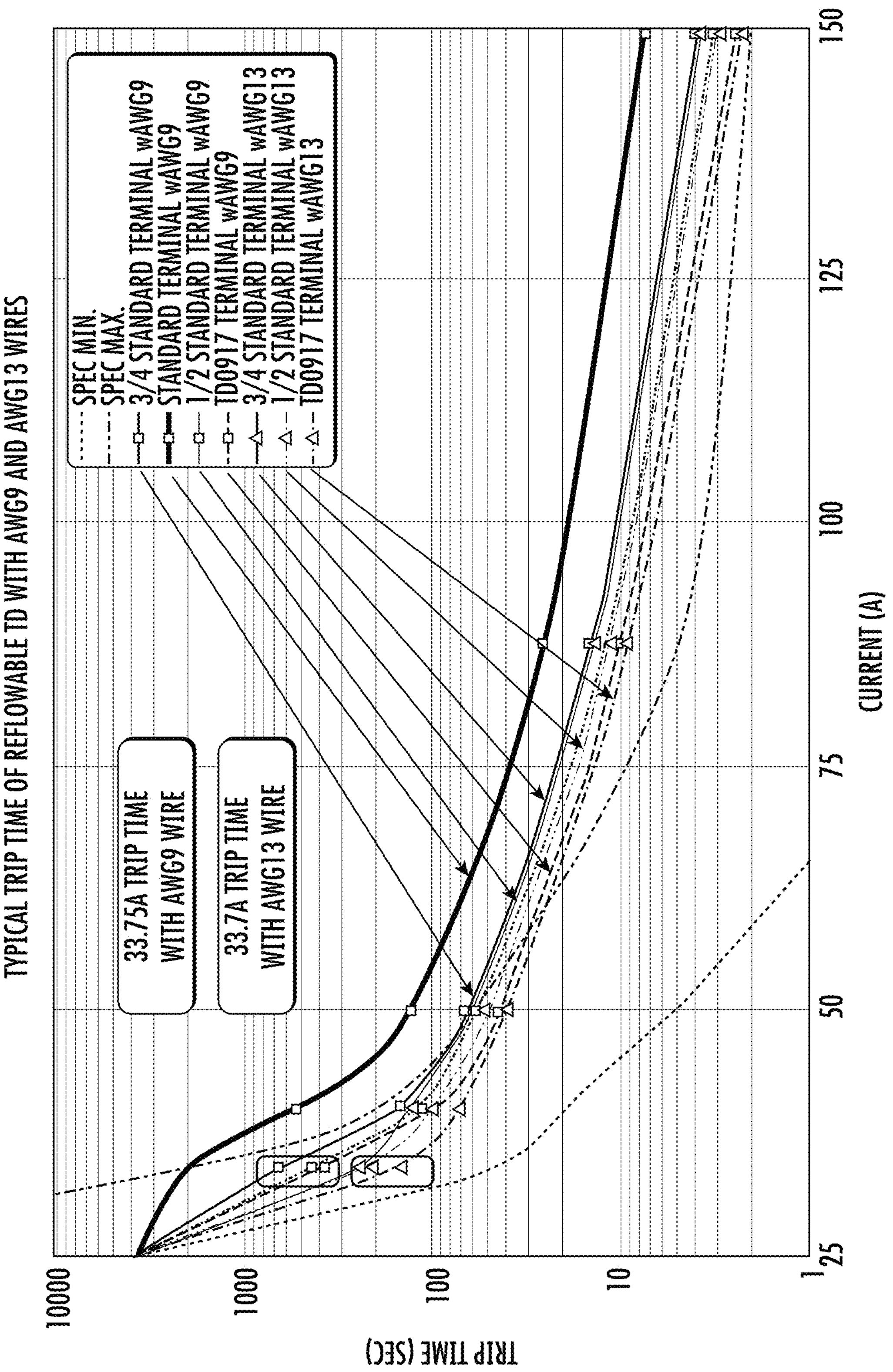
FIG. 2 illustrates trip time as a function of current for a resettable fuse, for various different terminal designs.

FIG. 2 presents a summary graph that illustrates trip time as a function of current for a resettable fuse, for various different terminal designs. In this graph, the two dashed lines indicate the boundary of the spec min and spec max values as a function of current. Note that trip time is presented on a logarithmic scale. As illustrated, the terminal assembly based upon a standard terminal and AWG9 wire generates excessive trip times for currents above 34 A that do not meet requirements, that is lie between spec min and spec max values. The terminal assembly designs according to the present embodiments can generally meet the requirements up to 50 A, by a combination of changing wire size and/or changing terminal design.

In particular, an AWG13 wire may be employed to conform to operating time requirements per ISO10924-3 standard, while dramatic changes in trip time can be brought about by changes in wire diameter and terminal design for currents in the 34 A to 50 A range for a device rated at 25 A. Moreover, the use of a cap, by providing better heat conduction, may help increase the trip time substantially at current levels between 34 A and 50 A. Finally, at higher current levels, such as 87.5 A to 150 A, the trip time will be determined nearly exclusively by the PPTC core properties of the PPTC device and does not depend upon the presence of a cap.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A terminal assembly, arranged for an automobile harness, comprising:
- a substrate;
- a modified terminal, comprising a plate structure that is arranged as a pair of plates on the substrate and extends perpendicularly with respect to a plane of the substrate; and
- a resettable fuse component, the resettable fuse component comprising a polymer positive temperature coefficient (PPTC) material, and coupled in series with the modified terminal, wherein the resettable fuse component is arranged between the pair of plates such that a portion of the resettable fuse component extends outside of the pair of plates, leaving an exposed portion of the resettable fuse component.

2. The terminal assembly of claim 1, wherein the modified terminal comprises a ¾ standard design.

3. The terminal assembly of claim 1, wherein the modified terminal comprises a ½ standard design.

4. The terminal assembly of claim 1, wherein the modified terminal comprises a TD0917 design.

5. The terminal assembly of claim 1, wherein the terminal assembly further comprises an AWG13 wire.

6. The terminal assembly of claim 1, wherein the resettable fuse component comprises a cap.

7. The terminal assembly of claim 1, wherein the modified terminal comprises a set of copper plates, and wherein the resettable fuse component comprises a PPTC body that is disposed between the set of copper plates.

8. The terminal assembly of claim 1, further comprising a substrate, wherein the modified terminal is disposed as a plate on the substrate and extends perpendicularly with respect to the substrate.

9. The terminal assembly of claim 8, wherein the substrate is a printed circuit board.

10. The terminal assembly of claim 1, wherein the resettable fuse component is provided with a cap.

11. A terminal assembly of an automobile harness, comprising:
- a substrate;
- a modified terminal, comprising a plate structure that is arranged as a pair of plates on the substrate and extends perpendicularly with respect to a plane of the substrate;
- a wiring assembly, coupled to the substrate; and
- a resettable fuse component, the resettable fuse component comprising a polymer positive temperature coefficient (PPTC) material, and coupled in series with the wiring assembly and the modified terminal, wherein the resettable fuse component is arranged between the pair of plates such that a portion of the resettable fuse component extends outside of the pair of plates, leaving an exposed portion of the resettable fuse component.

12. The terminal assembly of claim 11, wherein the modified terminal comprises a ¾ standard design.

13. The terminal assembly of claim 11, wherein the modified terminal comprises a ½ standard design.

14. The terminal assembly of claim 11, wherein the modified terminal comprises a TD0917 design.

15. The terminal assembly of claim 11, wherein the wiring assembly comprises an AWG13 wire.

16. The terminal assembly of claim 11, wherein the resettable fuse component comprises a cap.

17. The terminal assembly of claim 11, wherein the modified terminal comprises a set of copper plates, and wherein the resettable fuse component comprises a PPTC body that is disposed between the set of copper plates.

18. The terminal assembly of claim 11, further comprising a substrate, wherein the modified terminal is disposed as a plate on the substrate and extends perpendicularly with respect to the substrate.

19. The terminal assembly of claim 18, wherein the substrate is a printed circuit board.

20. A terminal assembly of an automobile harness, comprising:
- a substrate, arranged as a printed circuit board;
- a wiring assembly, comprising a pair of wires, coupled to the substrate;
- a modified terminal, comprising a plate structure that is arranged as a pair of plates on the substrate and extends perpendicularly with respect to a plane of the substrate; and
- a polymer positive temperature coefficient (PPTC) structure, arranged between the pair of plates, wherein the PPTC structure is coupled in series with the modified terminal, and wherein the PPTC structure extends outside of the pair of plates, leaving an exposed portion of the PPTC structure.

* * * * *